United States Patent [19]

Murakami et al.

[11] Patent Number: 4,579,200
[45] Date of Patent: Apr. 1, 1986

[54] INCHING CONTROL APPARATUS

[75] Inventors: Noboru Murakami, Nagoya; Choji Furusawa, Toyota; Toshiyuki Inagaki, Kariya, all of Japan

[73] Assignee: Aisin Seiki Kabushiki Kaisha, Aichi, Japan

[21] Appl. No.: 536,311

[22] Filed: Sep. 27, 1983

[30] Foreign Application Priority Data

Sep. 29, 1982 [JP] Japan ............... 57-168391
Oct. 29, 1982 [JP] Japan ............... 57-191263

[51] Int. Cl.⁴ .................................... F16D 67/04
[52] U.S. Cl. ........................ 192/4 A; 192/12 C; 192/87.19
[58] Field of Search ............ 192/3.57, 4 A, 4 C, 192/12 C, 13 R, 87.19

[56] References Cited

U.S. PATENT DOCUMENTS

| | | | |
|---|---|---|---|
| 3,125,201 | 3/1964 | Fisher | 192/4 A |
| 3,292,752 | 12/1966 | Schuster et al. | 192/4 A X |
| 3,400,601 | 9/1968 | Ruhl et al. | 192/4 C X |
| 3,631,948 | 1/1972 | Ishikawa et al. | 192/4 C |
| 3,715,017 | 2/1973 | Jenney | 192/4 A |
| 3,941,223 | 3/1976 | Murakami | 192/4 A |
| 3,948,366 | 4/1976 | Kitano et al. | 192/4 A |
| 3,957,145 | 5/1976 | Kitano et al. | 192/4 C X |
| 3,990,549 | 11/1976 | Sisson et al. | 192/4 A |
| 4,293,059 | 10/1981 | Lucas | 192/3.57 |

Primary Examiner—Allan D. Herrmann
Attorney, Agent, or Firm—Burns, Doane, Swecker and Mathis

[57] ABSTRACT

An inching control apparatus comprising a hydraulic pressure source, a plurality of clutches and, in a hydraulic circuit connecting the clutches to the hydraulic pressure source, a pressure regulating valve, an inching valve which receives output pressure from the pressure regulating valve for delivering inching control pressure, and a selector valve which receives control pressure from the inching valve for selecting engaging and disengaging the frictional engaging means. The inching valve delivers the output pressure from the pressure regulating valve directly when an inching pedal is not depressed by the driver's foot, and delivers a control pressure, which diminishes as the amount of pedal depression increases, when said amount of depression exceeds a predetermined amount. The inching valve controls the output pressure from the pressure regulating valve by operating an inching spool which is pushed through a first spring by an inching rod operatively associated with the pedal and biased by a second spring against the first spring, and which is equipped with first and second pressure-receiving portions operating against one another.

10 Claims, 6 Drawing Figures

INCHING CONTROL APPARATUS

BACKGROUND OF THE INVENTION

This invention relates to a hydraulic apparatus and, more particularly, to a transmission inching control apparatus for industrial vehicles.

There are various conventional methods available for controlling the inching of a transmission for industrial vehicles, particularly a transmission having a torque converter and a hydraulically operated friction engaging element (generally a clutch). In one such manner, as disclosed in the specification of Japanese Patent Publication No. 52-34088 (FIG. 1), an inching valve is used in a hydraulic system composed of a pressure source, a pressure regulating valve, a selector valve, a change valve, a modulator valve, a clutch and the inching valve itself, and clutch pressure is subjected to inching control through controlling the regulating pressure of the modulator valve by the inching valve in accordance with the stroke of the depressed brake pedal. With this manner, the inching valve has no influence upon the modulator valve output pressure when the pedal is held depressed by only a slight degree. When the amount of pedal depression exceeds a predetermined value, a controlling pressure, which from that point onward diminishes in accordance with an increase in the amount of pedal depression, acts upon the clutch as the modulator valve output pressure.

Though the modulator valve is arranged to smoothen the engagement of the clutch, with the above-described method there is still some residual clutch pressure even when the inching valve is in the region of near maximum displacement, as shown in the graph of FIG. 1. This residual pressure causes the clutch to drag when the inching valve has been displaced its full stroke, namely when the brake pedal is held fully depressed. This results not only in a shorter clutch lifetime but also in the danger of a sudden forward movement when the driver backs off the brake pedal slightly under a condition where the residual pressure is large in magnitude.

In another arrangement of the foregoing type, a disadvantage is encountered in that the clutch pressure (inching control pressure) varies with the oil temperature and engine rpm, as shown in the graph of FIG. 2, so that the point at which the clutch starts to engage (or disengage) is not determined precisely in accordance with valve displacement.

SUMMARY OF THE INVENTION

An object of the present invention is to provide an inching control apparatus which solves the foregoing problems encountered in the prior art by developing a clutch pressure which corresponds precisely to the operating stroke of the inching valve to afford an inching control pressure free of the effects of engine rpm.

Another object of the present invention is to provide an inching control apparatus in which there is no residual pressure even when an inching valve is operated through its full stroke.

Still another object of the present ihvention is to provide an inching control apparatus is which a sudden fluctuation in pressure does not occur when the inching valve begins pressure control at the initial part of its operating stroke, and which is designed so that a violent pressure fluctuation will not arise, even momentarily, over the entire operating region of the inching valve.

According to the present invention, the foregoing objects are attained by providing an inching control apparatus comprising a hydraulic pressure source, a plurality of frictional engaging means, a pressure regulating valve, an inching valve which receives output pressure from the pressure regulating valve for delivering inching control pressure, and a selector valve which receives control pressure from the inching valve for selectively engaging and disengaging the frictional engaging means. The pressure regulating valve, inching valve and selector valve are provided in the mentioned order, starting from the hydraulic pressure source side, in a hydraulic circuit connecting the hydraulic pressure source to the frictional engaging means. The inching valve is adapted to deliver the output pressure from the pressure regulating valve directly when an inching pedal is not depressed by the driver's foot, and to deliver a control pressure, which diminishes as the amount of pedal depression increases when said amount of depression exceeds a predetermined amount.

The inching valve controls the output pressure from the pressure regulating valve by operating an inching spool which is pushed through a first spring by an inching rod operatively associated with a pedal and biased (back-pressured) by a second spring against the first spring, and which is equipped with a plurality of (first and second) pressure-receiving portions operating against one another. By displacing the inching rod through compression of the first spring, input pressure to one (the second) pressure-receiving portion resisting the first spring is cut off and, at the same time or subsequent time, one (the second) pressure-receiving portion is placed in a state for discharging pressure while a control pressure produced by the inching spool is applied to the other (the first) pressure-receiving portion, thereby delivering a predetermined control pressure. Specifically, the inching valve includes an inching spool disposed in a cylinder, urged in opposite directions by first and second springs and equipped with first and second pressure-receiving portions on which input pressures are applied in the same directions as the first and second springs, respectively; an inching rod disposed in the cylinder, operatively associated with a pedal for subjecting the inching spool to a pushing force through the first spring, and having a land for controlling input pressure applied to the second pressure-receiving portion; a first oil chamber accommodating the first pressure-receiving portion for receiving the regulating pressure of the inching spool; and a second oil chamber acting upon the second pressure-receiving portion.

In one aspect of the present invention, the cylinder is provided with a number of ports arranged so that the inching rod will subject the second oil chamber to an input pressure up to a predetermined displacement of the inching rod, wherein when the predetermined displacement is attained, the inching rod cuts off the input pressure and releases the pressure of the second oil chamber. According to the arrangement of the ports, when the inching rod has moved beyond the predetermined displacement, the inching spool delivers a regulating pressure which diminishes in accordance with the inching rod displacement, the delivered pressure being less than the input pressure.

In another aspect of the present invention, the cylinder is provided with a number of ports arranged so that the inching rod will subject the second oil chamber to an input pressure up to a predetermined displacement of the inching rod, wherein when the predetermined displacement is attained, the inching rod cuts off the input pressure and releases the pressure of the second oil chamber thereafter. According to the arrangement of the ports, when the inching rod has moved beyond the predetermined displacement, the inching spool delivers a regulating pressure which diminishes in accordance with the inching rod displacement, the delivered pressure being less than the input pressure.

With the above-described construction, a change in clutch pressure (and, hence, axle torque), which is in accordance with the operating stroke of the inching valve, is rendered constant and independent of engine speed. In addition, the change which takes place in the inching state (i.e., half-clutch state) described a smoother and gentler slope.

Further, when the inching valve makes a full stroke in response to full depression of the pedal, residual output pressure (and, hence, clutch pressure) is reduced to zero, thereby mitigating clutch drag and lengthening clutch life. Eliminating residual pressure prevents sudden forward movement when the pedal is restored.

In another aspect of the present invention, the elements constituting the hydraulic circuit are accommodated in the form of a unit within a single block to reduce the size of the apparatus.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 4:
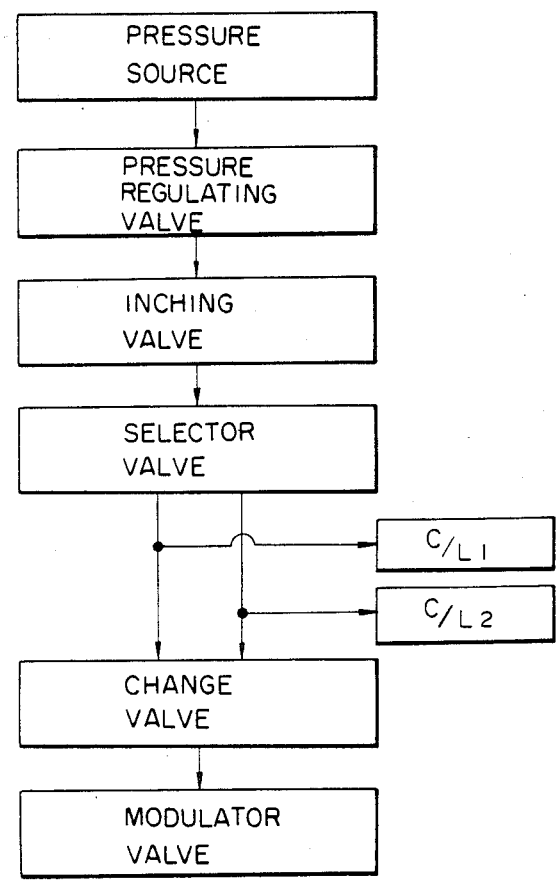
FIG. 4 is a flowchart of an embodiment of the present invention.

As shown in the flowchart of FIG. 4 illustrating an embodiment of the present invention, pressure is applied from a hydraulic pressure source to clutches C/L1, C/L2 through a pressure regulating valve, inching valve and selector valve, these elements forming a hydraulic circuit. The circuit also includes a change valve connected to the junctions of the selector valve and clutches, and a modulator valve connected to the change valve. The pressure acting upon the clutches will therefore also be applied to the change valve, which will in turn apply pressure to the modulator valve.

Figure 5:
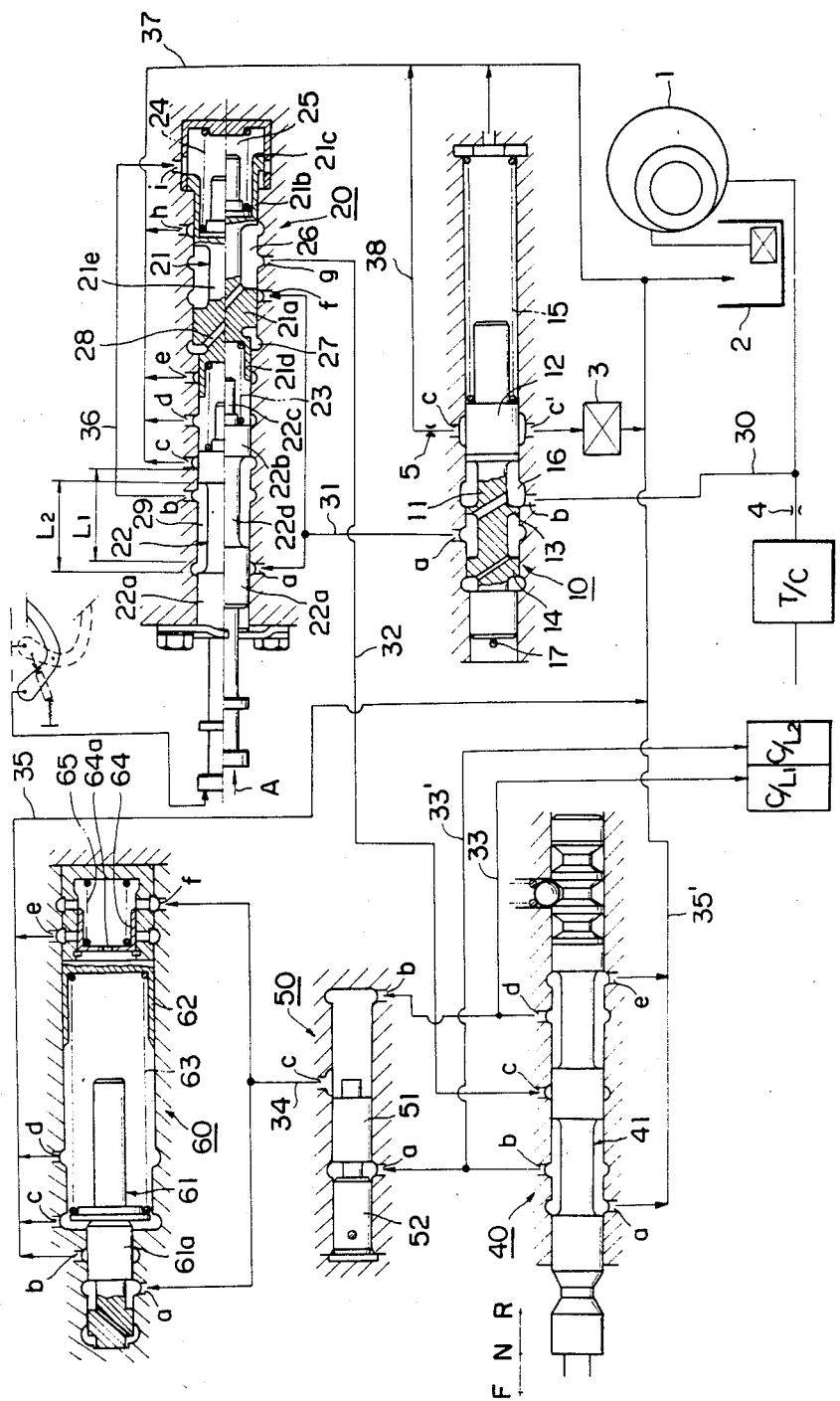
FIG. 5 is a hydraulic circuit illustrating an embodiment of an apparatus according to the present invention.

FIG. 5 illustrates the hydraulic circuit in greater detail. An oil pump 1, serving as the hydraulic pressure source, is rotated by the engine output shaft, not shown. The pump 1 has a discharge port connected to the input port b of a pressure regulating valve 10 through a line 30, which branches to a torque converter T/C through an orifice 4 and in turn oil to the lubricating portions of the clutches(not shown).

The pressure regulating valve 10 has an output port a connected to ports a, f of an inching valve 20 through a line 31, and the inching valve 20 has an output port g connected to an input port c of a selector valve 40 through a line 32. The selector valve 40 has output ports b, d connected to clutches C/L2, C/L1 through lines 33', 33, respectively, and to input/output ports a, b of a change valve 50, respectively, through lines branching from the lines 33', 33.

The change valve 50 also has an output port c for applying an input to input ports a, f of a modulator valve 60 through a line 34. The modulator valve 60 further includes ports b through e from which return oil is returned to an oil pan 2 through a line 35. The selector valve 40 also has discharge ports a, e from which oil is returned to the oil pan 2 through the line 35'.

Oil which has been discharged from the pressure regulating valve 10 is returned to the oil pan 2 from a port C through an orifice 5 and line 38, and from a port c' through a filter 3. The pressure regulating valve 10 itself may be of a type known in the art, and has a spool 11 urged from one end by a spring 15, the other end thereof being subjected to a pushing force, acting against the force of the spring, attributed to the input pressure acting upon lands 12, 13, 14. In balancing these two forces, the spool 11 is displaced to regulate the pressure, this being brought about by the land 12 which changes the opening degree between an oil chamber 16 and the ports c, c'. A stopper pin 17 serves to stop the spool 11.

The selector valve 40, of known construction, includes a spool 41 having two lands. The spool 41 performs a switching action by which the input port c is selectively communicated with or cut off from the output ports b, d. The change valve 50 selectively delivers either of the two outputs of the selector valve 40 to the modulator valve 60, this depending upon whether the selector valve 40 is switched to a forward postion F or reverse position R.

The modulator valve 60 may also be of known construction and is not described in detail. Suffice it to say that the modulator valve includes a spool 61 having a land 61a, the spool 61 being urged from the left against a spring interposed between the spool 61 and a piston 62, and a second piston 64, for controlling the ports e, f and having an orifice 64a, the second piston 64 being urged to the left by a spring 65. The modulator valve 60 alleviates the degree of change in the output pressure of the inching valve 20, namely the degree of change in the cluch pressure acting upon the clutches C/L1, C/L2. Of the clutches C/L1, C/L2, one is engaged and the other disengaged in accordance with whether the selector valve 40 is in the F or R position, respectively. Both clutches are in the disengaged state when the selector valve 40 is in the neutral, or N, position.

The inching valve 20 has a spool pushed by an inching rod through a spring. The spool is of the separating spool type, in which the spool is back-pressured against the first-mentioned spring by a spring acting in the opposite direction, and in which the control pressure thereof and input pressure act against each other upon the piston portion of the spool.

The inching valve 20 includes an inching spool 21 disposed in a cylinder and urged in opposite directions by first and second springs 23, 24. The inching spool 21 has lands 21a and 21b which control the degree of the communication between ports f and h to change the input pressure. The inching spool 21 also has a first pressure-receiving portion constituted by stepped lands 21a and 21d and a second pressure-receiving portion 21c. The first and second pressure-receiving portions have a first and second pressure working surfaces in first and second oil chambers 27 and 25, respectively. The first and second pressure working surfaces are subjected to hydraulic pressures which act in a same direction as the first and second springs 23 and 24, respectively and respectively An inching rod 22 is disposed coaxially within the cylinder and pushes the inching spool 21 through the first spring 23. The inching rod 22, operatively associated with a pedal (such as an inching pedal or brake pedal, not shown), operates in the direction of the arrow A. The inching rod 22 has lands 22a, 22b. Pressure input to the second oil chamber accommodating the second pressure-receiving portion 21c is supplied through ports a, b, i when the inching rod 22 is not pushed, which is the state indicated by the upper half of the inching valve 20 in FIG. 5. When the inching rod 22 is pushed (as indicated by the lower half of the inching valve 20 in FIG. 5), the port a is closed and the return port c is opened, so that pressure input to the second oil chamber is interrupted and released. To assure reliability of operation, the length (the minimum length of the inner edge portion) L1 between port a and port c, and the length (minimum length of the edge portion) L2 between land 22a and land 22b, are made equal, i.e., L1=L2.

The spool 21 has a passage 28 communicating the first oil chamber with a central oil chamber (control oil chamber) 26, so that the first oil chamber exerts control pressure to the right in FIG. 5. The spool 21 has a central, small diameter portion 21e which defines the central oil chamber 26. Hence, when the spool 21 is moved to the right (i.e., when the driver presses down on the pedal), the first land 21a closes off the input port f. The land 21b of the spool 21 closes off the discharge port h when the spool is inoperative, and opens the port h when the spool is operating. The left end of the spool 21 is formed to include a land on slide portion 21d which also serves as a seat for the first spring 23. The left end of the first spring 23 is seated on the second land 22b of the inching rod 22, and is fit on a projection 22c. The port i is in communication with the second oil chamber 25 at all times.

Discharge ports d, e constantly communicate the chamber accommodating the first spring 23 with a return line 37. The working surface of the first piston (pressure-receiving portion) is smaller than that of the second piston.

The inching rod 22 has a reduced diameter portion 22d between both lands to form a passage communicating ports a and b when the inching rod 22 is in its leftmost position, and ports b and c when the inching rod is displaced to the right.

The operation of the inching valve 20 will now be described. When the pedal is not depressed by the driver's foot, as indicated by the upper half of the inching valve 20 in FIG. 5, the output pressure of the pressure regulating valve 10 is applied to ports a, f through line 31, and is delivered from port a to the second oil chamber through ports b, i, so that the spool 21 is urged to the left together with the second spring 24. On the other hand, input pressure from the port f acts upon the first oil chamber through the central oil chamber 26 and passage 28, so that the spool 21 is urged to the right together with the first spring 23. Since the leftward directed pushing force is larger, the inching valve 20 remains in the state shown by the upper half thereof in FIG. 5, so that the discharge port h is closed. Therefore, input pressure from the output port g is introduced as line pressure into the select valve 40 through the line 32.

In this case, in accordance with the neutral position N (the state shown in FIG. 5), forward position F or reverse position R of the select valve 40, the input pressure is applied to neither clutch, to clutch C/L1, or to clutch C/L2. The pressure applied to the clutches is gently regulated in the modulator valve 60 through the change valve 50.

When the driver begins to press down on the pedal (as indicated at point P in FIG. 3.), the inching rod 22 begins to be moved in the direction of the arrow A, thereby closing the input port a and simultaneously opening the discharge port c to release the pressure from the second oil chamber 25. In consequence, the spool 21 is moved slowly to the right in accordance with the opening of the return port c, owing to the fact that the pressure in the second oil chamber 25 corresponds to the force differential between first spring 23 and second spring 24. The spool 21 therefore takes an intermediate position relative to the position shown by the lower half of FIG. 5. This corresponds to point r in FIG. 3. At this time, the return port h begins to be opened and the input port f begins to be closed, so that the hydraulic pressure prevailing within the central oil chamber 26 drops from the initial pressure. This corresponds to the portion of the graph extending from q to r in FIG. 3. Since the pressure in the first pressure chamber 27 becomes equal to the hydraulic pressure in the central oil chamber 26 at this time, the spool 21 assumes a position in accordance with the equilibrium obtained between the force applied by the second spring 24 and the resultant of the rightward pushing force of the first spring due to the rightward movement of the rod 22, and the rightward pushing force from the first oil chamber 27 acting upon the first land portion 21a. When the pedal is depressed further, the pushing force of the first spring 23 increases, so that the spool 21 is gradually moved rightward against the second spring 24. As a result, the inlet port f is gradually closed and the return port b is gradually opened, to that the output to the line 32 is reduced in inverse proportion to the displacement of the valve, as indicated by the portion of the graph extending from r to s in FIG. 3.

When the discharge port h is finally opened fully, the output pressure to the line 32 drops to zero. Further, at almost the same time, the end of the projection 22c of the inching rod abuts against the inching spool 21 and, when the pedal is depressed further, the inching spool 21 is moved to the right, without acting through the spring 23, to hold the output pressure at zero. This corresponds to point s in the graph of FIG. 3.

Figure 1:
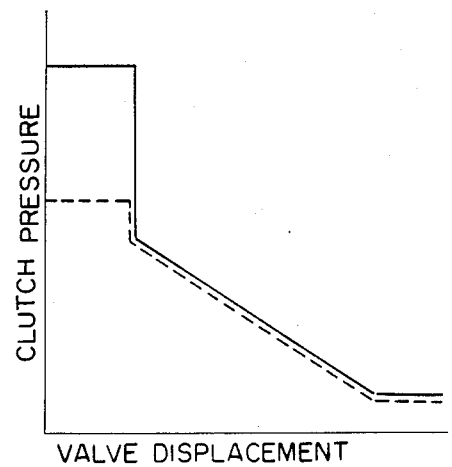
FIGS. 1 and 2 are graphs showing the relation between valve displacement and clutch pressure according to the prior art.
Figure 2:
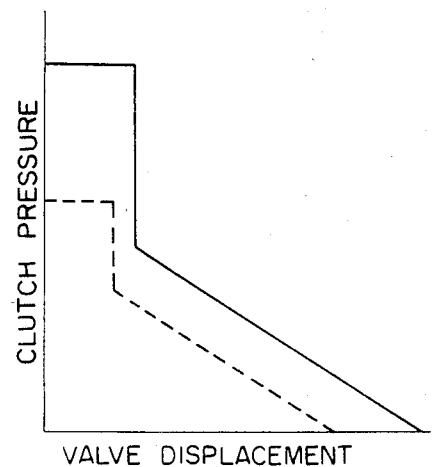
Figure 3:
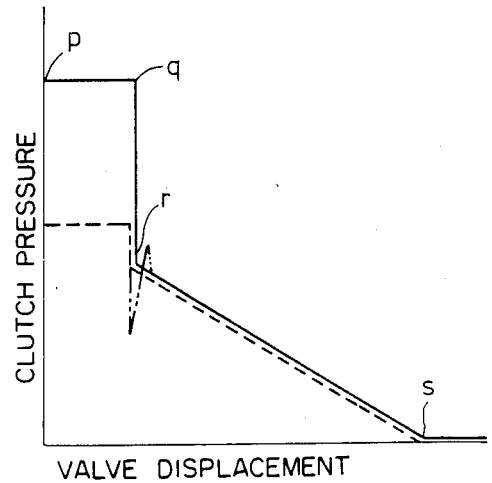
FIG. 3 is a graph showing the relation between valve displacement and clutch pressure according to an embodiment of the present invention.

When the pedal is gradually returned from the fully depressed position and restored to a predetermined position by reversing the foregoing steps, the clutch pressure makes the transition from point r to point q in the graph of FIG. 3, and the output pressure of the pressure regulating valve 10 is delivered directly to the line 32. When the pedal is restored further, the inching rod 22 is restored fully to the original position, during which time the output pressure remains the same.

According to the present invention having the foregoing construction, the spool 21 is not operated directly by depression of the pedal. As shown in FIG. 3, the output pressure (control pressure) of the inching valve during the inching operation is transmitted to the spool 21 through the inching rod and first spring, and the spool 21 is moved in accordance with the resultant of the force of the resisting spring and the control pressure working force attributed to the spool 21. Therefore, the output pressure varies constantly in accordance with the valve displacement. As a result, as shown by the dashed line in FIG. 3, the change in the output pressure of the inching valve will be constant, following the valve displacement, even when the engine speed is low and the output pressure from the pressure regulating valve is low. Specifically, the invention works to mitigate a fluctuation in the axle torque (clutch pressure), caused by a change in the amount of oil from the source of hydraulic pressure, when the pedal is depressed.

In the illustrated embodiment, it was stated that the condition L1=L2 holds. However, an embodiment is possible wherein the condition L1>L2 may be established. In such case, it is preferred that l (=L1-L2) be set to 0.5–1.0 mm. Through such an arrangement, when the inching rod 22 is operated, first port a will be closed, then, following further displacement, the return port c will be opened. As the inching rod 22 is displaced further, input pressure to the second oil chamber is first cut off, after which the pressure in the second oil chamber 25 is discharged. Accordingly, the inching valve 21 can be moved gently into the pressure regulating state (the state indicated by the lower half portion of FIG. 5), so that a pressure fluctuation, as shown by the two-dot chain line at r in FIG. 3, will not occur. This prevents sudden forward movement when gears are shifted at the same time that the inching pedal is restored. In addition, the invention prevents damage to a stopper abutting portion or spring retaining portion in the pressure regulating valve 10, as would otherwise be caused by violent movement of the spool resulting from the abovementioned pressure fluctuation.

As will be apparent from the foregoing description, the inching valve output drops to zero, without any residual pressure, when the pedal is fully depressed.

In the illustrated embodiment, the pair of springs (first and second springs) and the pair of pressure-receiving portions (first and second pressure-receiving portions) are provided on the spool 21. However, these elements can be constructed by combining them with two or more elements.

Figure 6:
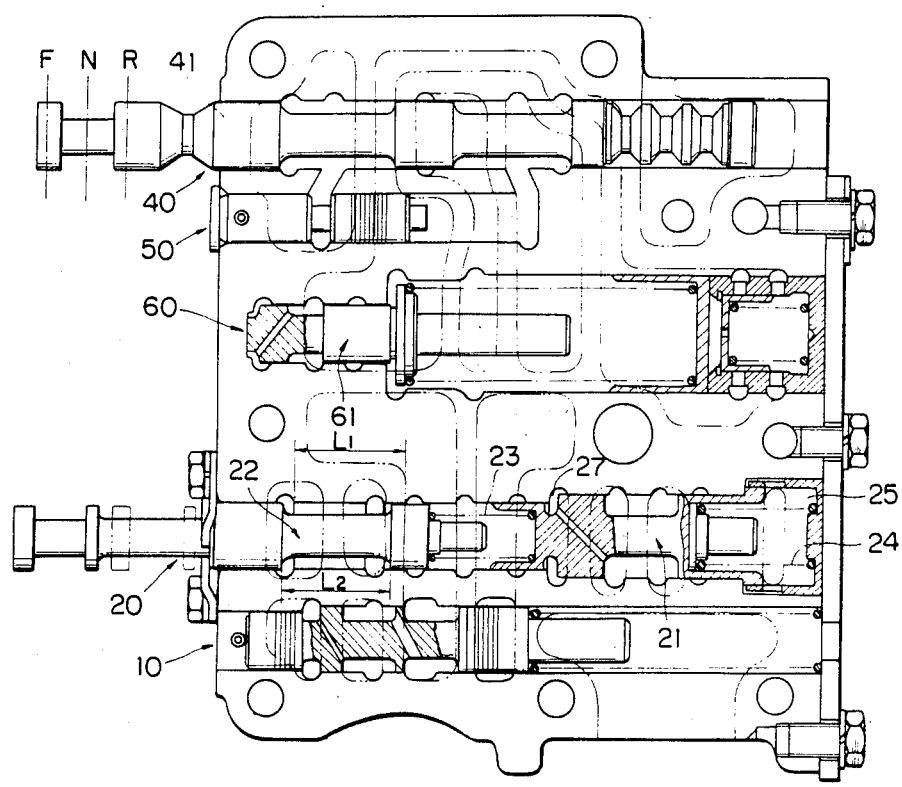
FIG. 6 is a sectional view of a block incorporating, in the form of a unit, the embodiment illustrated in FIG. 5.

FIG. 6 is a sectional view in which the foregoing illustrated embodiment is incorporated in an apparatus in the form of a single block. The apparatus of the present invention can thus be arranged into a compact unit so as to be readily installed in a vehicle and maintained with ease.

Although a certain preferred embodiment has been shown and described, it should be understood that many changes and modifications may be made therein without departing from the scope of the appended claims.

What we claim is:

1. An inching control apparatus comprising a hydraulic pressure source, a plurality of frictional engaging means, a pressure regulating valve, an inching valve which receives output pressure from said pressure regulating valve for delivering inching control pressure, and a selector valve which receives control pressure from said inching valve for selectively engaging and disengaging said frictional engaging means, said pressure regulating valve, said inching valve and said selector valve being provided in the mentioned order, starting from the hydraulic pressure source side, in a hydraulic circuit connecting said hydraulic pressure source to said frictional engaging means, said inching valve controlling the output pressure from said pressure regulating valve by operating an inching spool which is pushed through a first spring by an inching rod operatively associated with a pedal and back-pressured by a second spring against said first spring, and which is equipped with a plurality of pressure-receiving portions operating against one another, wherein when said inching rod is displaced under compression of said first spring from a state in which a control pressure port communcating with one of said pressure-receiving portions opposing said first spring is in communication with an input port for introducing the output pressure from said pressure regulating valve, the communication between said control pressure port and said input port is cut off and, at the same time, said control pressure port is communicated with a discharge port and the control pressure caused by said inching spool is applied to one of said pressure-receiving portions.

2. The apparatus according to claim 1, wherein said inching rod has two separated lands for respectively opening and closing said input port and said discharge port, the distance between said input port and said discharge port being equal to the distance between said two lands, said ports being opened at all times to a space formed between said two lands.

3. The apparatus according to claim 1 or claim 2, wherein said inching spool has an input port for introducing as input pressure the output pressure from said pressure regulating valve, and two separated lands for respectively opening and closing a port which discharges said input pressure, a control pressure output port being opened to a space formed between said two lands.

4. The apparatus according to claim 3, wherein control pressure is supplied to one of said pressure-receiving portions through a passage penetrating a portion of said inching spool defining one land portion thereof.

5. The apparatus according to claim 1, wherein said inching rod is arranged to abut against said inching spool without the intermediary of said first spring when control output pressure caused by said inching spool becomes substantially zero.

6. An inching control apparatus comprising a hydraulic pressure source, a plurality of frictional engaging means, a pressure regulating valve, an inching valve which receives output pressure from said pressure regulating valve for delivering inching control pressure, and a selector valve which receives control pressure from said inching valve for selectively engaging and disengaging said frictional engaging means, said pressure regulating valve, said inching valve and said selector valve being provided in the mentioned order, starting from the hydraulic pressure source side, in a hydraulic circuit connecting said hydraulic pressure source to said frictional engaging means, said inching valve controlling the output pressure from said pressure regulating valve by operating an inching spool which is pushed through a first spring by an inching rod operatively associated with a pedal and back-pressured by a second spring against said first spring, and which is equipped with a plurality of pressure-receiving portions operating against one another, wherein when said inching rod is displaced under compression of said first spring from a state in which a control pressure port communcating with one of said pressure-receiving portions opposing said first spring is in communication with an input port for introducing the output pressure from said pressure regulating valve, the communication between said control pressure port and said input port is cut off, after which said control pressure port is communicated with a discharge port and the control pressure caused by said inching spool is applied to one of said pressure-receiving portions.

7. The apparatus according to claim 6, wherein said inching rod has two separated lands for respectively opening and closing said input port and said discharge port, the distance between said input port and said discharge port being greater than the distance between said two lands, said ports being opened at all times to a space formed between said two lands.

8. The apparatus according to claim 6 or claim 7, wherein said inching spool has an input port for introducing as input pressure the output pressure from said pressure regulating valve, and two separated lands for respectively opening and closing a port which discharges said input pressure, a control pressure output port being opened to a space formed between said two lands.

9. The apparatus according to claim 8, wherein control pressure is supplied to one of said pressure-receiving portions through a passage penetrating a portion of said inching spool defining one land portion thereof.

10. The apparatus according to claim 6, wherein said inching rod is arranged to abut against said inching spool without the intermediary of said first spring when control output pressure caused by said inching spool becomes substantially zero.

* * * * *